(12) United States Patent
Baranski

(10) Patent No.: US 10,681,869 B1
(45) Date of Patent: Jun. 16, 2020

(54) BLADE THREADING DEVICE FOR A GRAIN HEADER

(71) Applicant: Frederick L. Baranski, Port Austin, MI (US)

(72) Inventor: Frederick L. Baranski, Port Austin, MI (US)

(*) Notice: Subject to any disclaimer, the term of this patent is extended or adjusted under 35 U.S.C. 154(b) by 205 days.

(21) Appl. No.: 15/812,613

(22) Filed: Nov. 14, 2017

Related U.S. Application Data

(60) Provisional application No. 62/421,398, filed on Nov. 14, 2016.

(51) Int. Cl.
*B23P 11/00* (2006.01)
*A01D 75/12* (2006.01)
*A01D 47/00* (2006.01)
*A01D 43/08* (2006.01)

(52) U.S. Cl.
CPC ........... *A01D 75/12* (2013.01); *A01D 43/088* (2013.01); *A01D 47/00* (2013.01)

(58) Field of Classification Search
USPC .......... 29/243.5, 243.56, 244; 30/144, 166.3, 30/249, 296.1
See application file for complete search history.

(56) References Cited

U.S. PATENT DOCUMENTS

| 679,213 | A | 7/1901 | Brown |
| 685,097 | A | 10/1901 | Bush |
| 839,850 | A | 1/1907 | Hummel |
| 2,332,840 | A | 10/1943 | Martin |
| 5,054,277 | A | 10/1991 | Schumacher, II et al. |
| 5,092,047 | A * | 3/1992 | Hinkley ............... A01G 3/08 30/166.3 |
| 5,105,518 | A | 4/1992 | Bengtson |
| 5,960,546 | A * | 10/1999 | Cooke ............... A01G 3/0255 30/188 |
| 6,785,969 | B2 * | 9/2004 | Wang ............... A01G 3/08 30/244 |
| 7,958,640 | B1 * | 6/2011 | Mandriota ............... A01G 3/08 30/144 |
| 2005/0166566 | A1 | 8/2005 | Majkrzak |
| 2008/0000210 | A1 | 1/2008 | Jolly |

* cited by examiner

*Primary Examiner* — Joseph J Hail
*Assistant Examiner* — Shantese L McDonald
(74) *Attorney, Agent, or Firm* — Cramer Patent & Design, PLLC; Aaron R. Cramer

(57) ABSTRACT

A blade replacement tool for use in replacing a combine cutting saw knife. The blade replacement tool includes a cable that is operatively connected to a connection link that is used for transferring pulling force to a connected combine cutting saw knife. A pull handle is fastened to the cable. The pull handle receives a pulling force that is transferred via the cable and via the connection link to a connected combine cutting saw knife. The cable is strong, thin and flexible. The pull handle is at least two feet (2 ft.) long. The connection link includes an attachment bracket having first and second apertures for attaching to a cutting saw knife (sickle) via mating apertures in a cutting saw knife (sickle).

9 Claims, 4 Drawing Sheets

BLADE THREADING DEVICE FOR A GRAIN HEADER

RELATED APPLICATIONS

The present invention was first described in and claims the benefit of U.S. Provisional Application No. 62/421,398 filed Nov. 14, 2016, the entire disclosures of which are incorporated herein by reference.

FIELD OF THE INVENTION

The present invention generally relates to agricultural combines. More particularly, the present invention relates to a low-profile threading tool for replacing the grain stalk cutting knives of a grain header of an agricultural combine.

BACKGROUND OF THE INVENTION

Modern agriculture relies upon a wide variety of machines to provide the high efficiency that is required to provide the food that we eat at a cost that we can afford. One (1) of the most well-known of these machines is the agricultural combine. Combines are principally used to harvest various grains.

The front part of a combine that is being used to harvest grains is called the grain header. The grain header utilizes a series of sharp knife blades (sickles) to cut the grain stalks which are then collected within the combine where the grain is then separated from the stocks. After separation, the grain is stored in the combine until it can be transferred to a truck or other transportation vehicle.

As with all complex mechanical devices agricultural combines are subject to wear and tear as well as mechanical breakage. Exacerbating the problem of mechanical breakage of combines is the prolonged continuous and arduous usage many combines experience during harvest season. In particular, grain header knife blades are subject to intense wear which necessitates relatively frequently replacement.

Complete replacement of a set of an agricultural combine knife blades usually necessitates the removal and replacement of up to thirty-five foot (35 ft.) long knife blades which need threading through the mechanical structures of a grain header. Replacement is a tough and dangerous job which can expose multiple workers to the sharp edges of the knife blades.

Accordingly, there exists a need for a device which assists replacement of reciprocating knife blades on a grain header that reduces physical risk to workers. Preferably such a device would make blade replacement faster and easier than in the prior art. Ideally such a device for replacing reciprocating knife blades would be cost effective and suitable for use on numerous brands of agricultural grain combines.

SUMMARY OF THE INVENTION

The principles of the present invention provide for a blade replacement tool which assists workers in replacing reciprocating knife blades on a grain header. That blade replacement tool reduces the physical risk to workers when replacing the knife blades. The blade replacement tool makes replacement faster and easier than in the prior art. In addition, the blade replacement tool is highly cost effective and is suitable for use on numerous brands of agricultural grain combines.

A blade replacement tool that is in accord with the present invention includes a connection link for connecting the blade replacement tool to a combine cutting saw knife, a cable that is operatively connected to the connection link for transferring pulling force to a connected combine cutting saw knife, and a pull handle that is fastened to the cable. The pull handle is for receiving a pulling force that is transferred via the cable and via the connection link to a connected combine cutting saw knife.

In practice the cable can be made of a steel cabling and may be one-quarter in (¼ in.) in diameter. A clamp assembly can connect the cable to the pull handle, which may be at least two feet (2 ft.) long. The connection link beneficially includes an attachment bracket while the connection link may include a cable swage stud that is operatively connected to the attachment bracket. The cable swage stud may be welded to the attachment bracket and/or crimped to the cable. The attachment bracket can include a first aperture for attaching to a cutting saw knife (sickle) and possibly a second aperture for also attaching to a cutting saw knife (sickle). The first and second apertures should be configured to mate with apertures in a cutting saw knife (sickle).

Another blade replacement tool that is in accord with the present invention includes a connection link for connecting to a combine cutting saw knife, a cable that is connected to the connection link for transferring a pulling force to the connection link, and a pull handle that is fastened to the cable. The pull handle is for transferring an applied pulling force via the cable to the connection link.

In practice the cable can be made of a steel cabling and a clamp assembly can connect the cable to the pull handle, which may be at least two feet long (2 ft.) long. The connection link beneficially includes an attachment bracket. The attachment bracket can include an aperture for attaching to a cutting saw knife (sickle). That aperture should be configured to mate with an aperture in a cutting saw knife (sickle).

A method of replacing a combine cutting saw knife (sickle) includes the steps of removing a cutting saw knife from a combine grain header, threading a blade replacement tool through the grain header, removing an end tooth of a replacement cutting saw knife (sickle) to expose a saw blade aperture, attaching the blade replacement tool to the replacement cutting saw knife (sickle) via the exposed saw blade aperture, pulling the blade replacement tool and its attached replacement cutting saw knife (sickle) through the grain header, separating the cutting saw knife (sickle) from the blade replacement tool, and reinstalling the end tooth.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
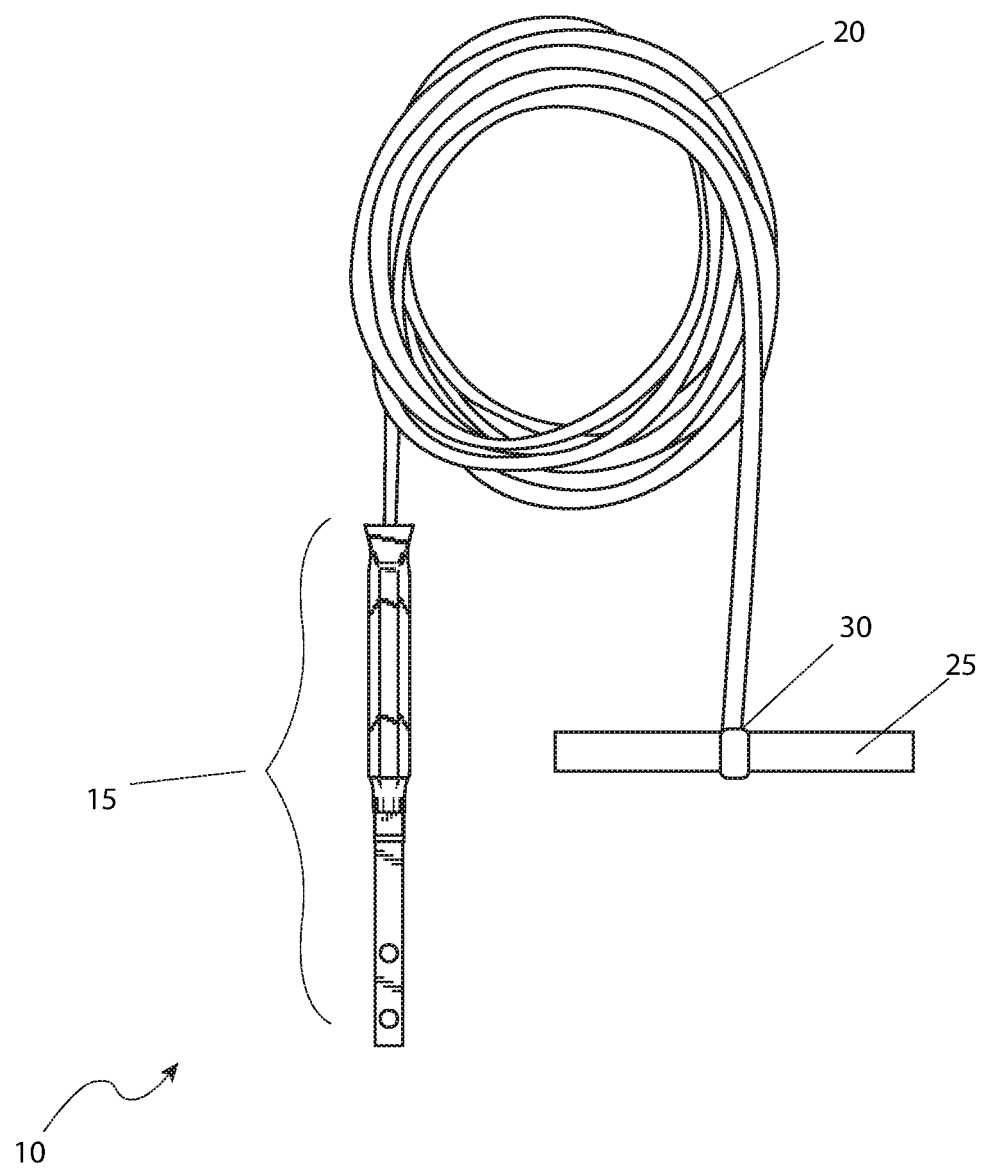
FIG. 1 is a perspective view of a blade replacement tool 10 for a combine grain header 105 that is in accord with the preferred embodiment of the present invention.

DESCRIPTIVE KEY 10 blade replacement tool
15 connection link 20 cable
25 pull handle
30 clamp assembly
35 cable swage stud
40 crimp
45 attachment bracket
50 welding
55 first aperture
60 second aperture
65 cutting saw knife (sickle)
70 mounting rail
75 cutting teeth
80 fastener
85 end cutting tooth
90 removal path "p"
95 first saw blade aperture
100 second saw blade aperture

DETAILED DESCRIPTION OF THE
PREFERRED EMBODIMENT

The preferred embodiment of the present invention is depicted in FIGS. 1 through 4. However, the invention is not limited to the specifically described embodiment. A person skilled in the art will appreciate that many other embodiments of the invention are possible without deviating from the basic concept of the invention. Any such work around will also fall under the scope of this invention.

The terms "a" and "an" as used herein do not denote a limitation of quantity, but rather denote the presence of at least one (1) of the referenced items.

Refer now to FIG. 1 for an illustration of a blade replacement tool 10 for replacing blades on a grain header. The blade replacement tool 10 has three (3) main components; a connection link 15, a cable 20, and a pull handle 25. As described in more detail subsequently the connection link 15 provides a mechanical connection to a cutting saw knife (sickle) 65 of a combine grain header (see FIG. 5). The cable 20 is a strong, flexible cable which transfers pulling forces to the cutting saw knife (sickle) 65. Because of its high strength and flexibility requirements, as well as the need to go through various relatively small holes, the cable 20 is envisioned as being comprised of relatively thin steel cabling. As an example, the cable 20 may be approximately one-quarter inch (¼ in.) in diameter and thirty-five feet (35 ft.) long. The pull handle 25 is securely fastened to the cable 20 by a clamp assembly 30 which is discussed in more detail subsequently.

The thinness and flexible nature of the cable 20 allows it to easily be threaded through various holes and around the obstacles that are typically found in grain headers.

The pull handle 25 is used by one (1) or more workers to pull the blade replacement tool 10 and an attached cutting saw knife (sickle) 65 as required. To that end, and while the overall dimensions of a pull handle 25 may vary, a highly beneficial pull handle 25 is approximately one and one-half inches (1½ in.) in diameter and at least two feet (2 ft.) long. That length enables two (2) people to pull on the pull handle 25.

Figure 2:
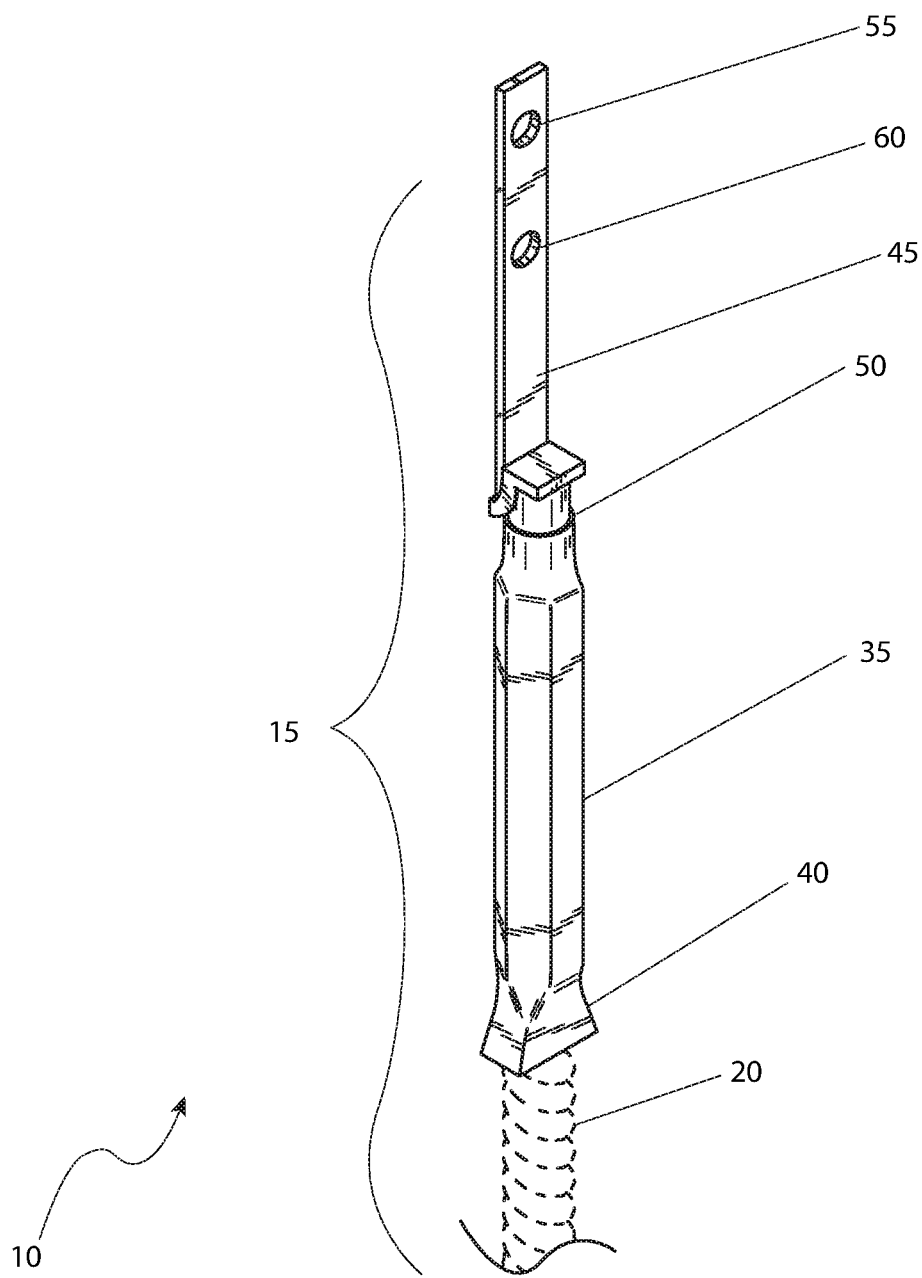
FIG. 2 presents a detailed view of a connection link 15 portion of the blade replacement tool 10 shown in FIG. 1.

Referring now to FIG. 2, the connection link 15 includes a cable swage stud 35 that is attached to the cable 20 by a crimp 40. This method of attachment (crimping) maintains an overall low profile which allows the connection link 15 to be easily threaded through holes in guards and inner mechanisms of a grain header.

One (1) end of the cable swage stud 35 is connected to an attachment bracket 45 via welding 50. The attachment bracket 45 has a first aperture 55 and a second aperture 60. The first aperture 55 and the second aperture 60 can vary in spacing and overall size to match the profile of different makes and models of cutting saw knives (sickle) 65.

Figure 3:
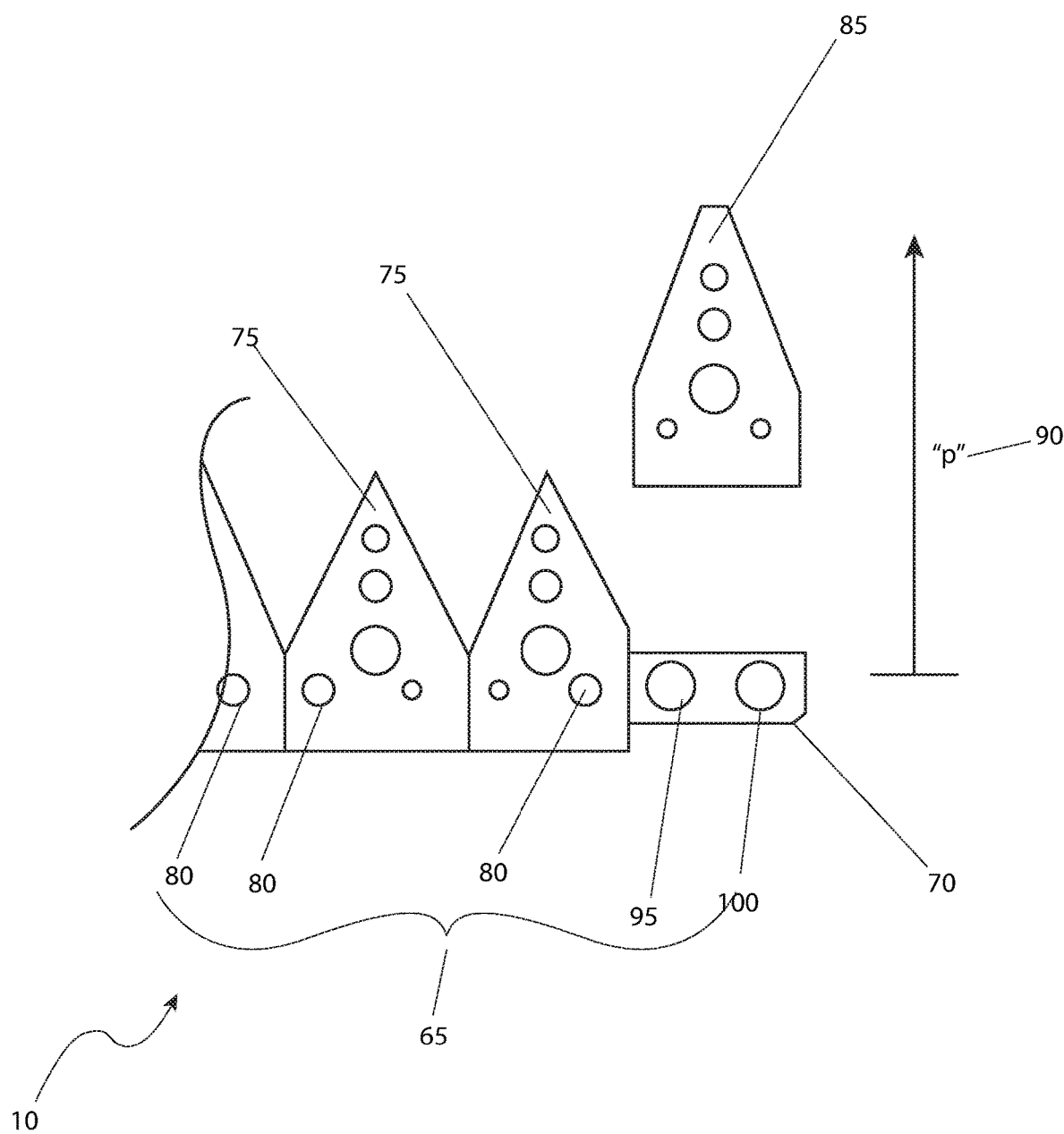
FIG. 3 is a perspective view of a cutting saw knife (sickle) 65 prior to attachment of the blade replacement tool 10 shown in FIG. 1; and, FIG. 4 presents a perspective view of the cutting saw knife (sickle) 65 after attachment to the blade replacement 10 shown in FIG. 1.

Referring now to FIG. 3, the cutting saw knife (sickle) 65 includes a mounting rail 70 upon which multiple cutting teeth 75 are mechanically attached. Attachment is accomplished by fasteners 80 such as bolts, screws, rivets, clips, brackets or the like. The particular inclusion or exclusion of any particular style of fastener 80 is not intended to be a limiting factor of the present invention.

An end cutting tooth 85 can be removed from the cutting saw knife (sickle) 65 along a removal path "p" 90 after its fasteners 80 are removed. When the end cutting tooth 85 is removed the first saw blade aperture 95 and the second saw blade aperture 100 are exposed. Importantly, the spacing and sizes of the first and second saw blade apertures 95, 100 correspond to those of the attachment bracket's 45 first and second apertures 55, 60 (see FIG. 2).

Figure 4:
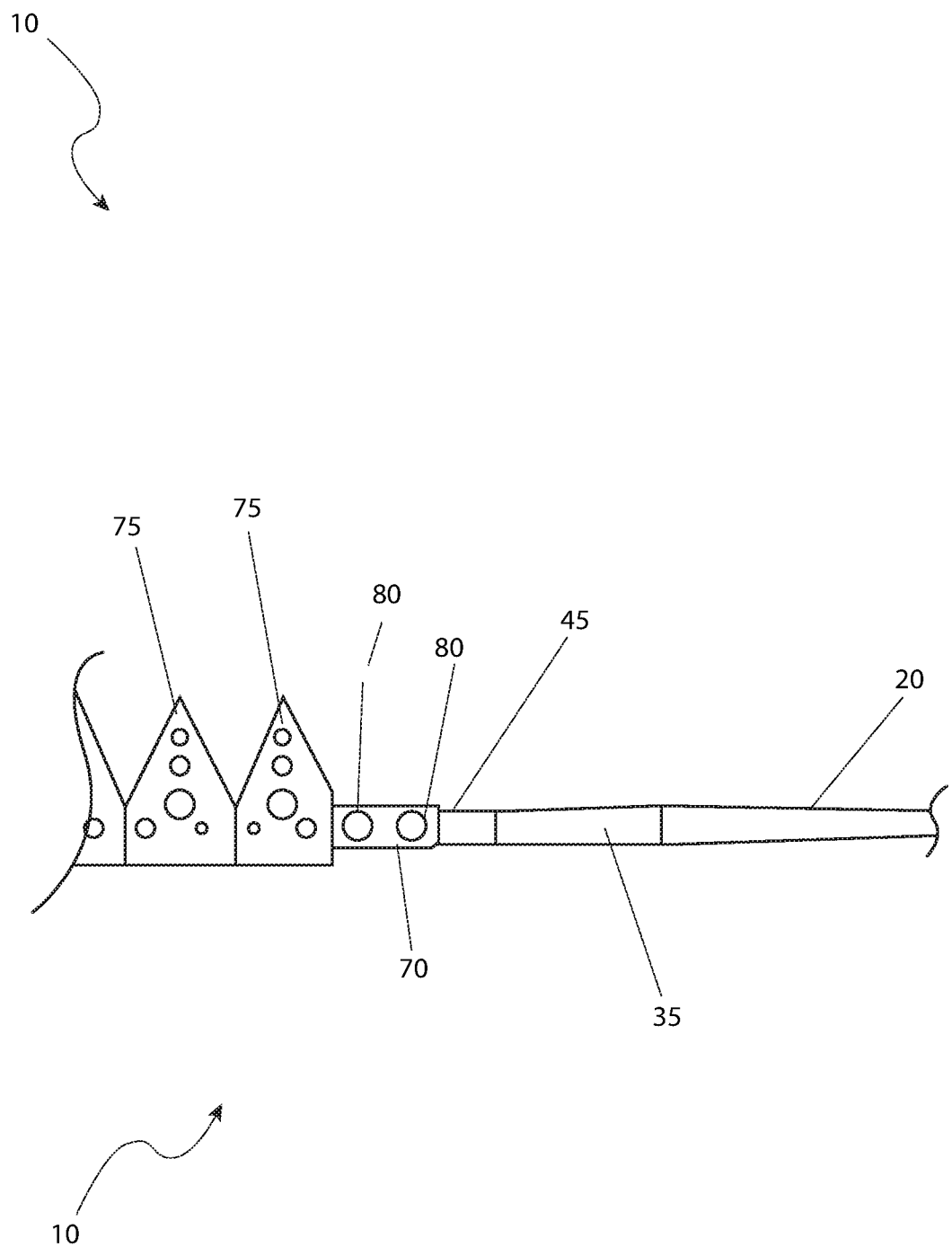

FIG. 4 present a perspective view of the cutting saw knife (sickle) 65 after it is attached to the blade replacement tool 10. The attachment bracket 45 is in mechanical contact with the mounting rail 70 and is secured in place with the same fasteners 80 that were used to hold the end cutting tooth 85 (see FIG. 3) in place. The assembly formed by the combination of the cable 20, the cable swage stud 35, the mounting rail 70 and the cutting teeth 75 is elongated and has a low profile that is designed to allow easy threading through a grain header.

The preferred embodiment of the present invention can be utilized by the common user in a simple and effortless manner with little or no training. It is envisioned that the blade replacement tool 10 would be constructed in general accordance with FIG. 1 through FIG. 4. A user would procure a blade replacement tool 10 having first and second attachment bracket 45 apertures 55, 60 that can mate via fasteners 80 to the first and second saw blade apertures 95, 100 of a cutting saw knife (sickle) 65 that is to be replaced. The user would gain access to the inside of a grain header via various existing plates, panels, openings, gaps and apertures. Next, the worn or broken cutting saw knife (sickle) 65 would be removed. Then, the connection link 15 of the blade replacement tool 10 would be threaded through the grain header via its various plates, panels, openings, gaps and apertures from one (1) end of the grain header to the other. At this point the blade replacement tool 10 is ready for attachment of the new cutting saw knife (sickle) 65. To do so the end tooth 85 of the new cutting saw knife (sickle) would be removed to free up its first and second saw blade apertures 95, 100.

The attachment bracket 45 would then be attached to the mounting rail 70 of the cutting saw knife (sickle) 65 using fastener 80 (see FIG. 4). Those fasteners 80 would pass through the first and second saw blade apertures 95, 100 and the attachment bracket's 45 first and second apertures 55, 60. The cutting saw knife (sickle) 65 cutting teeth 75 are then positioned in their proper orientation and alignment such that when they are pulled through the grain header by a user or users via the pull handle 25 the cutting teeth 75 are properly orientated. The cutting saw knife (sickle) 65 is then pulled into position by pulling forces on the pull handle 25. When in position the cutting saw knife (sickle) 65 is separated from the blade replacement tool 10 by removal of fasteners 80 and its end tooth 85 is then re-connected. The blade replacement tool 10 is then recoiled and stored until needed again.

Cutting saw knife (sickle) 65 replacement using the blade replacement tool 10 is envisioned as taking only a few minutes. As such its use is in sharp contrast to the prior art process which requires two to three (2-3) people, at least thirty minutes (30 min) of time, and exposes the workers to harmful contact with the sharp surfaces of the cutting teeth 75.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A blade replacement tool, comprising:
   a connection link for connecting to a combine cutting saw knife;
   a cable operatively connected to said connection link, said cable for transferring a pulling force to a connected combine cutting saw knife; and,
   a pull handle fastened to said cable, said pull handle for receiving a pulling force that is transferred via said cable and via said connection link to a connected combine cutting saw knife;
   a clamp assembly connecting said cable to said pull handle;
   wherein said connection link includes an attachment bracket;
   wherein said connection link includes a cable swage stud operatively connected to said attachment bracket;
   wherein said cable swage stud is welded to said attachment bracket;
   wherein said attachment bracket includes a first aperture for attaching to a cutting saw knife;
   wherein said attachment bracket further includes a second aperture for attaching to a cutting saw knife; and
   wherein said attachment bracket first and second apertures are configured to mate with apertures in a cutting saw knife.

2. The blade replacement tool of claim 1, wherein said cable is comprised of steel cabling.

3. The blade replacement tool of claim 2, wherein said steel cabling is one quarter inch in diameter.

4. The blade replacement tool of claim 1, wherein said pull handle is at least two feet long.

5. The blade replacement tool of claim 1, wherein said cable swage stud is crimped to said cable.

6. A blade replacement tool, comprising:
   a connection link for connecting to a combine cutting saw knife;
   a cable crimp connected to said connection link, said cable for transferring a pulling force to the connection link; and,
   a pull handle fastened to said cable, said pull handle for transferring an applied pulling force via said cable to said connection link;
   a clamp assembly connecting said cable to said pull handle;
   wherein said connection link includes an attachment bracket;
   wherein said attachment bracket includes an aperture for attaching to a combine cutting saw knife;
   wherein said attachment bracket aperture is configured to mate with an aperture in a combine cutting saw knife.

7. The blade replacement tool of claim 6, wherein said cable is comprised of steel cabling.

8. The blade replacement tool of claim 6, wherein said pull handle is at least two feet long.

9. A method of replacing a combine cutting saw knife comprising the steps of:
   removing a cutting saw knife from a combine grain header;
   threading a blade replacement tool through the grain header;
   removing an end tooth of a replacement cutting saw knife to expose a saw blade aperture;
   attaching the blade replacement tool to the replacement cutting saw knife via the exposed saw blade aperture;
   pulling the blade replacement tool and its attached replacement cutting saw knife through the grain header;
   separating the cutting saw knife from the blade replacement tool; and,
   reinstalling the end tooth.

\* \* \* \* \*